United States Patent
Varreng

[11] Patent Number: 6,105,247
[45] Date of Patent: Aug. 22, 2000

[54] METHOD OF MAKING A CABLE JOINT

[75] Inventor: Jan Sverre Varreng, Oslo, Norway

[73] Assignee: Alcatel, Paris, France

[21] Appl. No.: 09/087,295

[22] Filed: May 29, 1998

[30] Foreign Application Priority Data

Jun. 16, 1997 [EP] European Pat. Off. ............. 97401364

[51] Int. Cl.[7] ............................ H01R 43/04; H01R 43/00
[52] U.S. Cl. .................................. 29/871; 29/868; 29/869
[58] Field of Search ............................. 29/866, 868, 869, 29/871; 174/23.1, 22 R, 73.1

[56] References Cited

U.S. PATENT DOCUMENTS

| 3,667,119 | 6/1972 | Cleaver et al. ........................... 29/870 |
| 3,688,397 | 9/1972 | Cleaver et al. ........................... 29/860 |
| 3,691,291 | 9/1972 | Taj ........................................ 174/73.1 |
| 3,718,749 | 2/1973 | Cunningham ......................... 174/73.1 |
| 3,795,758 | 3/1974 | O'Mara . |
| 4,006,288 | 2/1977 | Stevens .................................. 174/73.1 |
| 4,034,151 | 7/1977 | Silva et al. ............................. 174/73.1 |
| 4,778,948 | 10/1988 | Fitch et al. ............................. 174/88 R |

FOREIGN PATENT DOCUMENTS

| 0644641 | 3/1995 | European Pat. Off. . |
| WO 86/02210 | 4/1986 | WIPO . |

*Primary Examiner*—Carl J. Arbes
*Attorney, Agent, or Firm*—Ware, Fressola, Van der Sluys & Adolphson LLp

[57] ABSTRACT

The present invention relates to a method for making a cable joint between two polymer insulated power cables (1,2) including the steps of jointing the two bare cable conductors. (3,4) and placing a heat sink device (6) over the joint The method includes preheating the heat sink device which per se consists of a longitudinally split metal sleeve (7,8) with inner side ridges (9,10,11,12) and pressing the hot heat sink ridges into the polymer insulation (13,14) on both sides of the joint to anchor the polymer insulation to the heat sink (6).

1 Claim, 1 Drawing Sheet

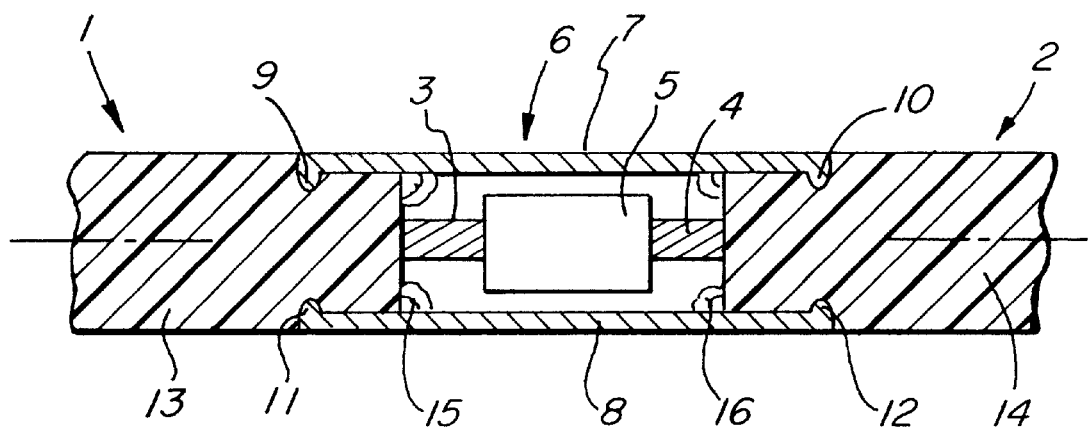

METHOD OF MAKING A CABLE JOINT

BACKGROUND OF THE INVENTION

1. Technical Field

The present invention relates to joints between electrical power cables and in particular to jointing of polymer insulated cables. The jointing technique includes jointing of the two bare cable conductors and reconstructing the insulation and semiconductive layers over the conductor joint.

2. Description of the Prior Art

A technical problem is to install a heat sink device over the conductor joint, and prevent shrinkback of the cable insulation in the completed joint. A solution to this problem is described in WO 86/02210 where shrinkback is prevented by anchoring a special heatsink device in the polymer insulation sheaths on both sides of the conductor joint. Special grooves are premade in the insulation material to fit inner ridges of the heat sink device. Making of suitable grooves do, however, require special cutting tools.

SUMMARY OF THE INVENTION

The object of the present invention is to provide an alternative and simpler solution to the known problem. The basic idea is to preheat the heat sink halves and melt/press the hot heat sink inner ridges into the cable insulation. The main features of the invention are defined in the claims. The solution is quick and requires no special cutting tools.

Above mentioned and other features and objects of the present invention will clearly appear from the following detailed description of embodiments of the invention taken in conjunction with the drawing.

BRIEF DESCRIPTION OF THE DRAWING

The FIGURE is a longitudinal cross-sectional view through a cable joint between the ends of two cross linked polyethylene insulated cables.

DETAILED DESCRIPTION OF THE INVENTION

The drawing schematically illustrates a longitudinal cut through a cable joint between the ends of two crosslinked polyethylene insulated cables 1 and 2. The cable ends are usually mounted in a jig (not shown) during the jointing process. The outer layers of the cables and the joint are not shown. The cable conductors 3 and 4 are as illustrated jointed in a ferrule 5 and a heat sink device 6 is indicated.

The heat sink device consists of two sleeve halves 7 and 8 having inner side ridges 9, 10, 11 and 12. When the conductor jointing has been completed and the cable ends are still in the jig, the heat sink 6 is installed over the joint by heating the two halves 7,8 of the heat sink and pressing the hot heat sink ridges 9–12 into the polymer insulation 13, 14. The hot ridges melt the polymer material sufficiently to anchor the polymer insulation on both sides of the joint to the heat sink ridges. Most of the melted polymer will flow into the joint as indicated at 15 and 16. When the heat sink sleeve has been installed, the joint is completed with ordinary outer protective layers.

This method has by experiments and electrical tests been proved to be quick and reliable. Shrinkback of the polymer insulation is effectively prevented.

The above detailed description of embodiments of this invention must be taken as examples only and should not be considered as limitations on the scope of protection.

What is claimed is:

1. Method for making a cable joint comprising the steps of:

(a) providing two power cables, each having polymer insulation and a bare cable conductor end;

(b) joining the bare cable conductor ends of the two power cables to create a conductor joint;

(c) heating a heat sink device, the heat sink device comprising a longitudinally split metal sleeve with inner side ridges; and (d) pressing the inner side ridges of the heated heat sink device into the polymer insulation on both power cables so as to span the conductor joint and melt the polymer insulation to anchor the polymer insulation to the heat sink device.

* * * * *